July 27, 1937.   G. G. MERCHEN   2,088,334
SCALE
Filed May 21, 1935   3 Sheets-Sheet 1
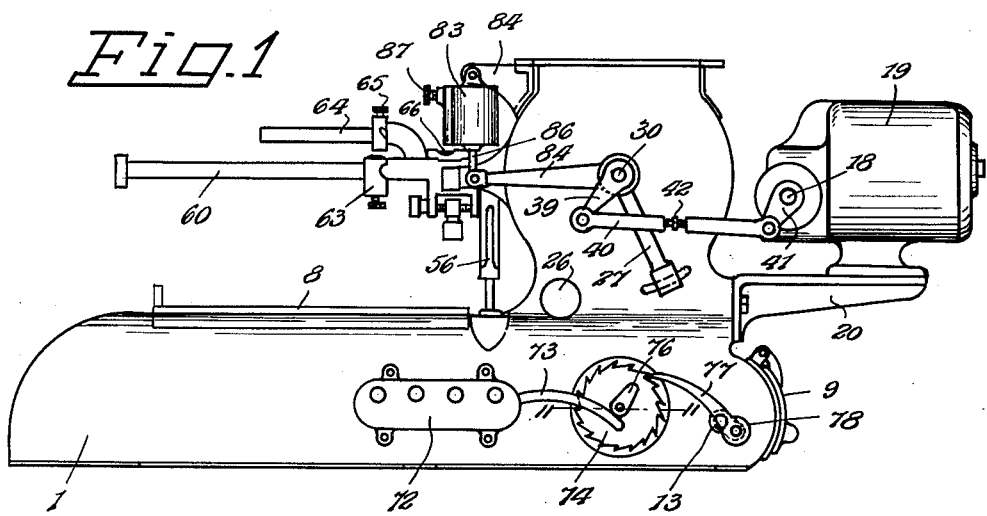
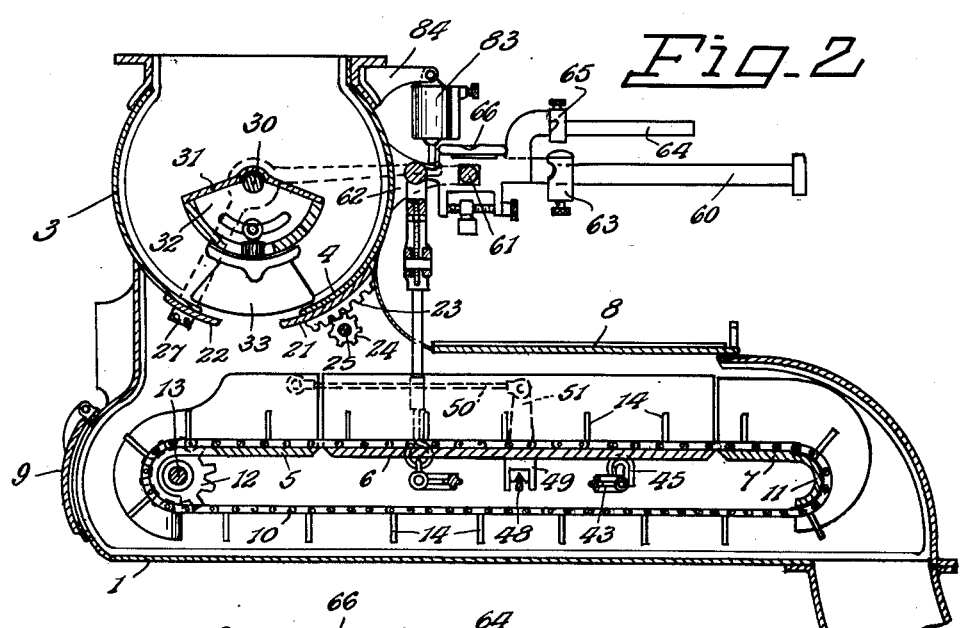
Inventor
Glen G. Merchen
By Glenn L. Fish
Attorney July 27, 1937.  G. G. MERCHEN  2,088,334
SCALE
Filed May 21, 1935  3 Sheets-Sheet 2
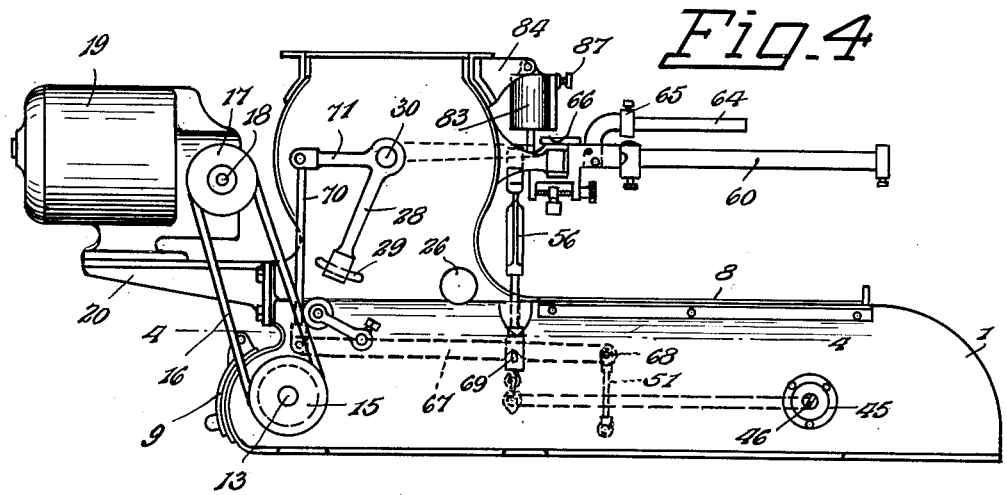
Fig. 4
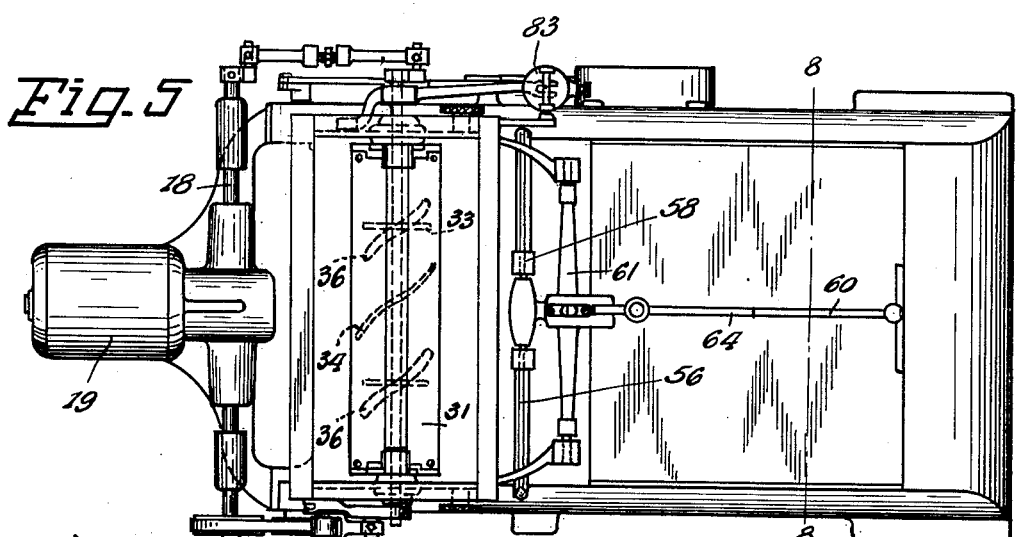
Fig. 5
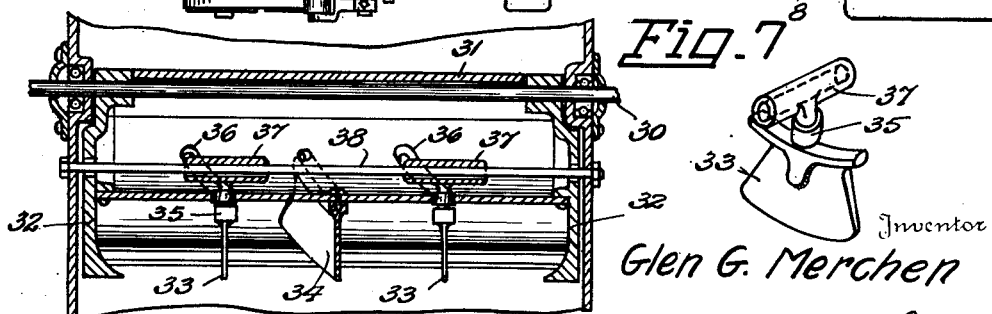
Fig. 6
Fig. 7
Inventor
Glen G. Merchen
By Glenn L. Fish
Attorney July 27, 1937.　　　G. G. MERCHEN　　　2,088,334
SCALE
Filed May 21, 1935　　　3 Sheets-Sheet 3
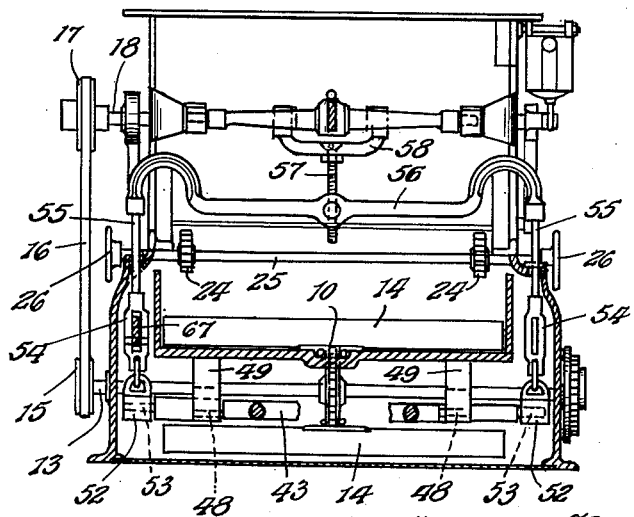
Fig. 8
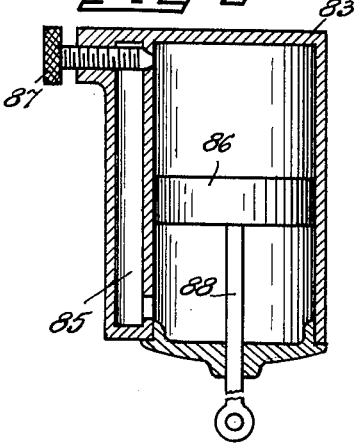
Fig. 9
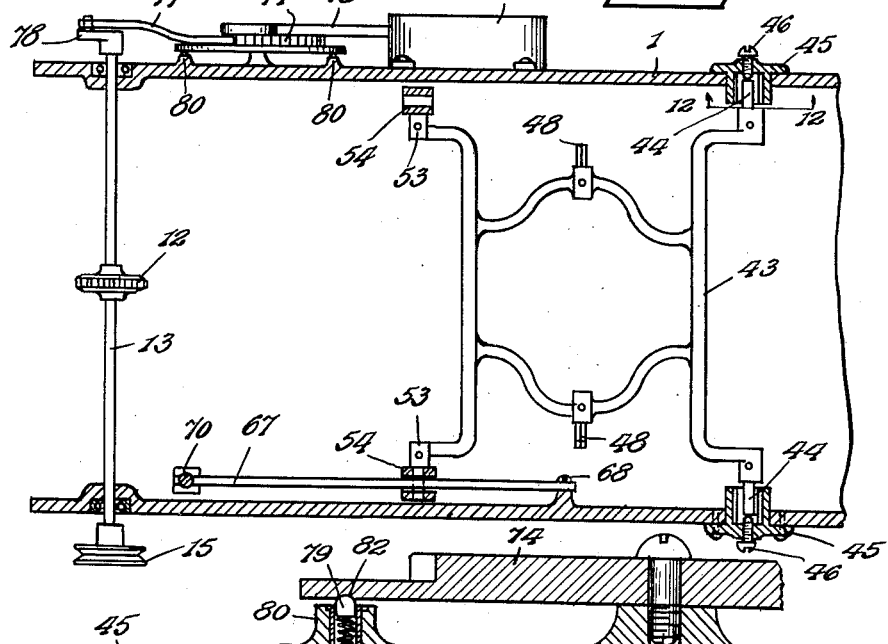
Fig. 10
Fig. 11
Fig. 12
Inventor
Glen G. Merchen
By Glenn L. Fish
Attorney Patented July 27, 1937

2,088,334

UNITED STATES PATENT OFFICE 2,088,334

SCALE

Glen G. Merchen, Spokane, Wash.

Application May 21, 1935, Serial No. 22,641

3 Claims. (Cl. 249—2)

This invention relates to an improved scale for weighing a continuously moving mass of feed, grain, cement, crushed ore, or any other material which may be fed from a hopper or other container as a continuously flowing stream and moved across a weighing platform at a predetermined rate of speed.

One object of the invention is to provide a scale wherein the weighing platform may be balanced when a predetermined weight of material is upon the platform and to further provide improved means for controlling flow of material from a hopper, the means for controlling flow of material from the hopper being operatively connected with the weighing platform and its balancing means so that the proper quantity of material will at all times be upon the weighing platform when the device is in operation.

Another object of the invention is to not only provide means actuated from the weighing platform for regulating flow of material from the hopper but to also provide a manually adjustable closure for the outlet of the hopper and thus permit the manually adjustable closure to be opened to such an extent that approximately the correct quantity of material will flow from the hopper. In addition an auxiliary closure or floating gate is adjusted in accordance with movements of the weighing platform to very accurately control the flow of material from the hopper.

Another object of the invention is to provide a scale wherein the material will be transported across the weighing platform by an endless conveyor actuated by a motor and, in addition, to provide the scale with a counter having an operating element driven by means carried by a shaft of the endless conveyor so that proper count of the quantity of material which has passed over the weighing platform may be made.

Another object of the invention is to provide the hopper with a floating gate which is operatively connected with the balancing means for the weighing platform and has associated with it a stabilizer which controls movements of the floating gate toward and away from a closed position.

Another object of the invention is to provide a scale of this character which will be very accurate in its operation and may be easily set, it being a further object of the invention to so construct the scale that it will not be liable to get out of order and fail to operate properly The invention is illustrated in the accompanying drawings, wherein Figure 1 is a view looking at one side of the improved scale.

Figure 2 is a longitudinal sectional view taken vertically through the scale.

Figure 3 is an enlarged fragmentary sectional view of the inner end portion of the scale beam.

Figure 4 is an elevation looking at the opposite side of the scale from Figure 1.

Figure 5 is a top plan view of the scale.

Figure 6 is a fragmentary sectional view taken vertically through the hopper and the agitator mechanism therein.

Figure 7 is a perspective view of one of the agitator blades.

Figure 8 is a sectional view taken transversely through the scale along the line 8—8 of Figure 5.

Figure 9 is an enlarged sectional view of a stabilizing device forming part of the scale.

Figure 10 is a fragmentary sectional view taken longitudinally through the scale along the line 4—4 of Figure 4.

Figure 11 is an enlarged fragmentary sectional view taken along the line 11—11 of Figure 1.

Figure 12 is a view of one of the knife bearings used in the construction of the scale, the view being taken along the line 12—12 of Figure 10.

This improved scale has a housing or casing 1 which is formed of metal and is of greater length than width. At one end the housing is formed in its bottom with a discharge opening establishing communication with a spout which may be of any length desired and lead to a storage bin, grinder, or any other apparatus or location to which it is desired to have the material pass after being weighed. An inlet is provided in the top of the casing at the opposite end thereof from the discharge opening and at this end the casing or housing is extended upwardly to form a hopper 3 having a bottom 4 disposed over the inlet opening of the housing and formed with an outlet opening through which material is to pass from the hopper into the housing. A plate or receiving platform 5 is mounted in the housing under the outlet opening of the hopper to receive the material as it flows from the hopper and thereby eliminate any likelihood of the falling material interfering with proper balancing of a weighing platform 6 which extends longitudinally in the housing between the receiving platform 5 and a discharge platform 7 mounted in the other end portion of the housing between the weighing platform and the discharge opening of the housing. A sliding top 8 is provided in order that access may be had to the interior of the housing over the weighing platform when necessary and there has also been provided an end door 9 which is hinged at its upper end so that it will normally remain closed but may be opened in case cleaning or repairs are necessary.

In order to move material from the receiving platform 5 along the weighing platform 6 and discharge platform 7, there has been provided an endless conveyor consisting of a chain 10 which extends longitudinally in the housing with its upper flight resting upon the platforms in the depressed channel formed intermediate the width thereof, as shown in Figure 8. One end portion of this sprocket chain engages about the downwardly curved lip 11 of the discharge platform and its other end portion is engaged about a sprocket wheel 12 carried by a shaft 13 which extends transversely through the casing with its ends projecting from opposite sides thereof. Blades 14 are mounted transversely of the sprocket chain and extend the full width of the platforms, as shown in Figure 8, so that as the sprocket chain is moved longitudinally of the casing, the blades will transport the material from one platform to another and finally off of the discharge platform into the spout 2. Upstanding flanges are provided at opposite sides of the platforms, as clearly shown in Figures 2 and 8, so that there will be no danger of the material dropping from sides of the platform as it is moved along the same by the blades. At one end, the shaft 13 carries a pulley wheel 15 about which is engaged a belt 16 and this belt is also trained about a pulley 17 carried by a shaft 18 which is driven by an electric motor 19 mounted upon a supporting bracket 20 secured to and projecting from the casing at the base of the hopper. It will thus be seen that when the scale is in use and the motor started, continuous motion will be imparted to the endless conveyor from the shaft 18 which is rotated at a great deal less speed than the main shaft of the motor and, therefore, the blades of the conveyor as they move along the platforms will transport the material from the receiving platform at such a speed that an excessive quantity of material will be prevented from accumulating upon the receiving platform.

In order to control flow of material from the hopper through the outlet opening in the bottom thereof, there has been provided a manually adjustable gate or closure 21 and a floating gate 22 which operate from opposite portions of the outlet opening. The manually adjustable gate is slidably mounted for movement along the curved bottom of the hopper and carries racks 23 which mesh with pinions 24 carried by a shaft 25. This shaft extends transversely through the hopper with its end portions journaled through side walls of the casing below the hopper and projecting ends of the shaft carry hand wheels 26, either one of which may be grasped to rotate the shaft 25 and move the gate 21 toward or away from a closed position. Therefore, this manually adjustable gate may be moved to an adjusted position and allow material to flow from the hopper at approximately the proper speed. The floating gate also extends transversely of the hopper under the same and has its opposite ends secured to arms 27 and 28 which project outwardly through arcuate slots 29 formed in side walls of the casing under the bottom of the hopper. These arms extend upwardly at opposite sides of the hopper and are loosely mounted upon protruding end portions of a shaft 30 which extends transversely through the hopper at a point substantially midway the depth thereof. Therefore, the floating gate will be mounted for movement across the outlet opening of the hopper toward and away from the manually adjusted gate. The manner in which this floating gate is automatically actuated will be hereinafter set forth.

The contents of the hopper should be agitated when the scale is in use so that it will not have an opportunity to cake and fail to flow freely through the outlet at the bottom of the hopper. Therefore, there has been provided a hood 31 which extends transversely in the hopper and has heads 32 at its ends which are fixed to the shaft 30 so that when the shaft is rocked, oscillating motion will be imparted to the hood. Portions of the upper wall of the hood diverge from opposite sides thereof, as shown in Figure 2 and, therefore, as the shaft is rocked, this hood will impart motion to the portion of the material above it and cause the material to be agitated. There has also been provided agitator blades 33 and 34 which are disposed under the hood transversely thereof and by referring to Figures 5 and 6 it will be seen that the blades 33 extend at right angles to the shaft 30 and the hood, whereas the blade 34 extends diagonally. The blade 34 is rigidly secured to the curved under portion of the hood but the blades 33 are movable and each has a shank 35 which extends upwardly through a slot 36 formed diagonally in the curved under portion of the hood. At its upper end each shank carries a sleeve 37 which extends transversely of the blade 33 and is slidably mounted upon a rod 38 extending longitudinally through the hood with its end portions passing through arcuate slots formed in the heads 32 and secured in side walls of the hopper. By this arrangement, the hood may have sliding movement in the hopper and as the hood moves, the diagonally extending walls of the slots 36 will exert a cam action upon the shanks 35 of the blades 33 and cause these blades to slide longitudinally of the rod 38. Therefore, the material in the lower portion of the hopper under the hood and directly above the outlet opening of the hopper will be thoroughly agitated and caused to flow through the outlet opening and down upon the receiving platform where it will be engaged by the blades of the conveyor and transported along the weighing platform and discharge platform. At one end the shaft 30 carries a crank arm 39 which is connected by a pitman 40 with a crank arm 41 fixed to the shaft 18 and as the shaft 18 rotates, the pitman and the crank 39 will impart rocking movement to the shaft 30. The pitman is formed of separate end sections connected by an adjusting screw 42 so that the effective length of the pitman may be regulated and proper movement imparted to the rocker shaft.

In order to support the weighing platform there has been provided a frame 43 which extends longitudinally in the casing 1 and at one end is formed with side extension or pintles 44 which fit into bearings 45 carried by side walls of the casing or housing and are engaged at their ends by set screws 46 so that end play will be eliminated. The pintles each taper transversely to form a lower knife edge, as shown in Figure 12, and rest upon bearing blocks 47 carried by the bearings 45. Other pintles 48 extend transversely from the frame 43 intermediate ends thereof and are engaged by depending bearing arms 49 carried by the weighing platform. The platform is held in an upright position by a link 50 which extends longitudinally in the casing with one end pivoted to the casing and its other end to a side portion of the platform, as shown at 51. Sockets 52 which are engaged with pintles 53 at the opposite end of the frame from the pintles 44 are suspended from links 54 carried by rods 55 depending from opposite ends of a yoke or cross bar 56 which, in its turn, is carried by a threaded stem 57 depending from a hanger or bracket 58 carried by a cross head 59 at the inner end of a balancing bar 60 of the scale. This balancing bar is pivoted upon a shaft 61 supported by brackets 62 which project from the hopper. The balancing bar carries a sliding weight 63 which is to be slid along the bar when setting the scale and there has also been provided an auxiliary balancing bar 64 which rises from the bar 60 and carries a sliding weight 65. By this arrangement, the weight 63 and the smaller weight 65 may be slid along the bars 60 and 64 and when secured will cause the weighing platform to be evenly balanced when a predetermined weight of material is upon the weighing platform. A level 66 is carried by the balancing bar over the shaft 61 in order that the operator may readily determine whether or not the scale is operating properly. A lever 67 extends longitudinally in the frame with one end pivoted to a side wall thereof, as shown at 68, and upon referring to Figures 8 and 10 it will be seen that this lever extends through one of the links 54 where it is pivotally mounted, as shown at 69 in Figure 4. This lever has its other end pivoted to the lower end of a link or rod 70 which extends vertically through the top of the casing at one side of the hopper and has its upper end pivoted to a side extens on 71 carried by and extending horizontally from the pivotally mounted upper end of the arm 28 of the floating gate. It will thus be seen that vertical movement of the weighing platform will cause movement to be automatically transmitted to the floating gate and the floating gate will be moved toward or away from a closed position according to the direction in which the weighing platform moves. By this arrangement the manually operated gate may be opened to approximately the proper distance in order to allow material to flow from the hopper at the desired rate of speed to cause a predetermined quantity of material to be fed to the receiving platform and as this material is moved onto the weighing platform and the weighing platform is shifted downwardly by the weight of the material, the floating gate will be gradually moved toward a closed position until the weighing platform comes to a stop and is evenly balanced by the weights 63 and 65. Any variation in the position of the weighing platform due to a variation in the weight of the material or the quantity delivered to the weighing platform will move the floating gate either toward a closed or an opened position and thus move the floating gate to a position in which a large or smaller stream of material will be permitted to flow through the outlet opening and the difference will be compensated for. It will thus be seen that when the scale is in use and the weighing platform has initially received its proper load of material, this load will be maintained and as the material is continuously moved across the weighing platform by the conveyor which moves at a known speed, the quantity which passes over the weighing platform in a given length of time will be known.

It is desired to physically indicate to the operator the quantity of material which has passed through the weighing device or scale and therefore there has been provided a counter 72 which is mounted upon the casing at one side thereof and is provided with an actuating lever 73. This lever or handle 73 extends longitudinally of the casing with its free end portion extending across a ratchet wheel 74 pivoted to the casing by a screw 75. A cam 76 is carried by the ratchet wheel for engaging the handle or lever 73 and the teeth of the ratchet wheel are engaged by a pawl 77 which is loosely mounted upon a crank arm 78 fixed to the shaft 13 at the opposite end thereof from the pulley 15. A latch or brake 79 which is mounted in a socket 80 projecting from the casing is urged outwardly by a spring 81 and is adapted to engage in a series of recesses 82 formed in a circular path about the ratchet wheel in the inner face thereof. Either one, two or any other number of latches may be provided and serve very effectively to yieldably resist rotation of the ratchet wheel. Therefore, when the device is in operation and the pawl is reciprocated by the crank 78 turning with the shaft 13, the ratchet wheel will be rotated in a step by step movement and for each rotation of the ratchet wheel the cam 76 will act upon the handle 73 to cause one operation of the counter. In the present illustration the ratchet wheel has thirty-five teeth and, therefore, the shaft 13 must rotate thirty-five times in order to effect one operation of the counter and since it will have been previously determined how much material will be moved across the weighing platform for each thirty-five rotations of the shaft 13, the counter will accurately indicate the quantity of material which has been weighed.

It is desired to have the floating gate stabilized so that its movements will not be erratic and, therefore, there has been provided a stabilizing mechanism for a cylinder 83 which is suspended from the bracket 84 at the upper end of the hopper. This cylinder is formed with a by-pass 85 having openings at its upper and lower ends so that as a piston 86 moves vertically in the cylinder, air may be forced through the by-pass passage from one end of the cylinder to the other. A set screw 87 which is movable toward and away from the opening at the upper end of the by-pass passage controls the speed at which air may pass through the by-pass passage and will, therefore, regulate the freedom with which the piston moves in the cylinder. The piston is provided with a rod 88 which extends downwardly through the bottom of the cylinder and at its lower end is pivoted to a side arm 89 formed integral with and extending transversely from the upper end of the arm 27 of the floating gate. Therefore, this piston will serve as a check to control movement of the floating gate and prevent it from moving too freely. It will thus be seen that when the floating gate is moved it will be shifted toward or away from manually adjustable gate and will come to a stop without vibrating. A stabilized motion will thus be established for the floating gate and flow of material from the hopper accurately controlled.

Having thus described the invention, what is claimed as new is:

1. In an apparatus of the character described, a hopper having an outlet at its bottom, a stationary receiving platform under said hopper, a weighing platform leading from said receiving platform, a frame supporting said weighing platform and adapted to have pivotal movement when the weighing platform is depressed by weight of material thereon, a floating gate for the outlet disposed under the hopper and having arms rising from its ends and pivotally mounted at the sides of the hopper, a balancing beam pivotally carried by said hopper and connected with the supporting frame for balancing the weight of the weighing platform, an auxiliary arm extending laterally from one arm and connected with the balancing beam for imparting movement to the gate in a closing direction when the weighing platform is depressed, a second auxiliary arm extending laterally from the other arm of the gate, a stabilizing device carried by said hopper and connected with said second auxiliary arm, and a conveyor for moving material along said platforms.

2. In an apparatus of the character described, a hopper having an outlet in its bottom, a stationary receiving platform under said hopper, a weighing platform leading from said receiving platform, a frame supporting said weighing platform and adapted to have pivotal movement when the weighing platform is depressed by weight of material thereon, a balancing beam pivotally carried by said hopper and connected with the supporting frame for balancing the weight of the platform, a stationary delivery platform at the other end of the weighing platform from the receiving platform, and a conveyor for moving material along the platforms from one to another and off of the delivery platform.

3. In a weighing apparatus, material delivering means, a stationary receiving platform under said delivering means, a weighing platform leading from said receiving platform, means for balancing said weighing platform, a stationary delivery platform at the other end of the weighing platform from said receiving platform, and a conveyor for moving material along said platforms from one to another and off of the delivery platform.

GLEN G. MERCHEN.